Figure 1:
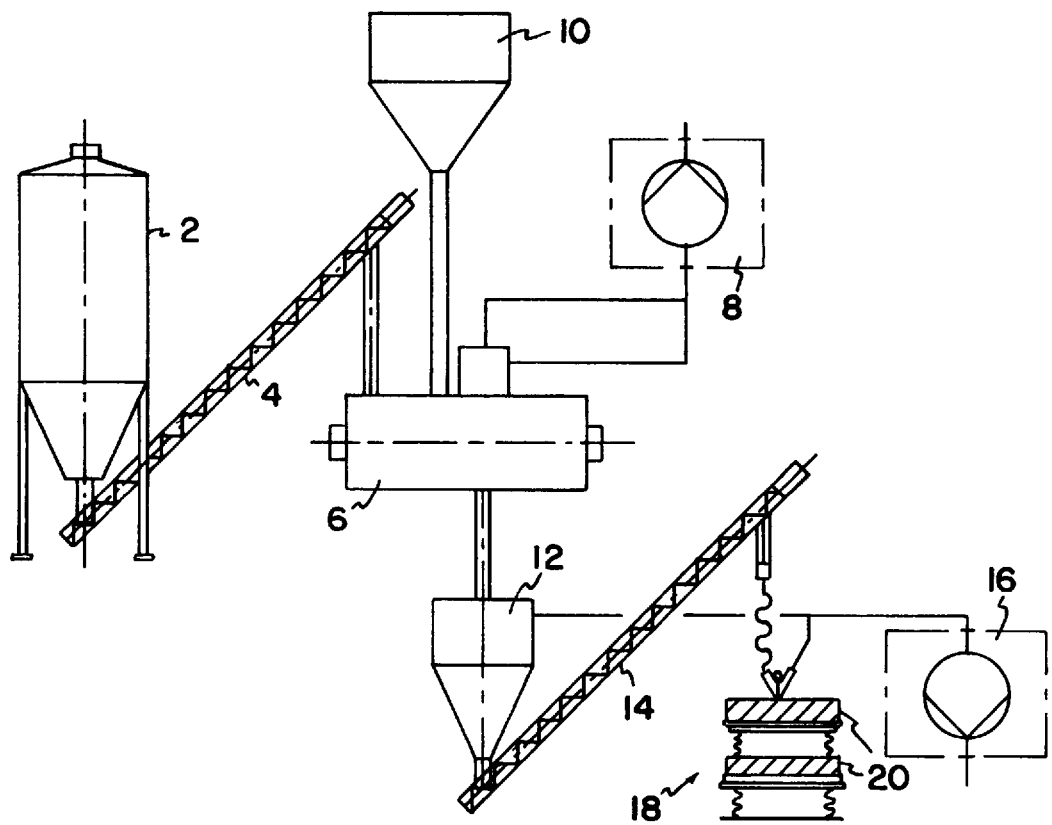

United States Patent
Schilf

Patent Number: 5,855,724
Date of Patent: Jan. 5, 1999

[54] METHOD FOR PRODUCING THERMOISOLATING ELEMENTS AND ELEMENTS PRODUCED BY THIS METHOD

[76] Inventor: Lothar Schilf, Millionenstrasse 27, 2816 Kirchlinteln, Germany

[21] Appl. No.: 62,576

[22] Filed: May 17, 1993

[30] Foreign Application Priority Data

May 18, 1992 [DE] Germany ................... 42 16 411.7

[51] Int. Cl.⁶ .................................................. B32B 31/14
[52] U.S. Cl. ........................................... 156/286; 428/69
[58] Field of Search .................. 428/69, 76; 156/70, 156/286

[56] References Cited

U.S. PATENT DOCUMENTS

| | | | |
|---|---|---|---|
| 4,486,482 | 12/1984 | Kobayashi et al. | 428/69 |
| 4,668,551 | 5/1987 | Kawasaki et al. | 428/69 |
| 4,862,674 | 9/1989 | Lejondahl et al. | 53/432 |
| 5,362,541 | 11/1994 | Sextl et al. | 428/69 |

FOREIGN PATENT DOCUMENTS

| | | |
|---|---|---|
| 0017095 A1 | 10/1980 | European Pat. Off. . |
| 0106103 A1 | 4/1984 | European Pat. Off. . |
| 0260699 A2 | 3/1988 | European Pat. Off. . |
| 0297061 A2 | 12/1988 | European Pat. Off. . |
| 3318524 A1 | 11/1983 | Germany . |

*Primary Examiner*—Alexander Thomas
*Attorney, Agent, or Firm*—Merchant, Gould, Smith, Edell, Welter & Schmidt

[57] ABSTRACT

A method for producing thermo-insulating elements wherein porous, powdery insulating material is thermally degassed and poured into an evacuated casing. Getter material is mixed with insulating material to form a mixture. The mixture is then thermally degassed. The degassed mixture is poured into an evacuated casing, which is then sealed. The getter material may comprise powdery or pellet-shaped molecular sieve, a zeolitic material, or a metal alloy. The method may be performed by degassing the mixture in a vacuum drier, and feeding the mixture in continuous vacuum into a permanently evacuated container.

9 Claims, 1 Drawing Sheet

METHOD FOR PRODUCING THERMOISOLATING ELEMENTS AND ELEMENTS PRODUCED BY THIS METHOD

DESCRIPTION

The invention relates to a method for producing thermo-insulating elements in which porous, powdery insulating material is thermally degassed and poured into an evacuated casing, which is subsequently hermetically closed off. The invention relates, furthermore, to a thermo-insulating element produced by that kind of method.

From EP-O 017 095 a method is known for producing elements for internal thermal insulation of high pressure containers or pipes in which the porous, powdery insulating material is poured into a vacuum-type casing and is annealed, free of gases, in combination with the casing, during or after the filling, whereby the casing is subsequently evacuated and then hermetically closed off.

In this familiar method it turned out that it is preferable that the degassing of the powdery insulating material is carried out in a separate vacuum dryer, prior to pouring it into the casing, in order to make possible a continuous industrial production of thermo-insulating elements. Subsequently, the degassed insulating material is poured into the evacuated casing, which is then hermetically closed off.

In this process development it is detrimental that the casing itself is no longer subjected to a thermal degassing and that, therefore, the casing is degassed after the interior space has been closed off and, thereby, the original vacuum deteriorates. Depending on the quality of the surfaces or surface sections of the vacuum casing that face the vacuum chamber, this can lead to such a deterioration of the vacuum that the function of the highly efficient thermal insulation is no longer fulfilled, after only a short service life.

This counts especially for those applications in which the thermal insulation or parts thereof are exposed to temperatures above the normal room temperature during the operation. Moreover, also the thermally degassed insulating material releases residual impurities in the casing whereby the vacuum in the casing—and thus, the insulating property of the insulating elements—is deteriorated.

It is the task of the invention to further develop a method of the type mentioned in the beginning in such a manner that the produced elements have improved thermo-insulating properties—especially during a long service life. This problem is solved according to the invention in the method of the type mentioned in the beginning by the fact that a getter material is mixed with the insulating material prior to the closure of the casing.

This problem is furthermore solved by thermo-insulating elements that comprise a gas-tightly closed casing and thermally degassed, porous, powdery insulating material in the casing whereby getter material is mixed into the insulating material within the casing.

The advantages of the invention lie especially in that, jointly with the degassed insulating material, also getter material is poured into the casing. If then, after the closure of the casing, the casing wall and/or the insulating material release impurities, these particles will be adsorbed to the getter material and, therefore, do not, or only insignificantly, interfere with the vacuum inside the casing.

Preservation of a sufficient vacuum guarantees that the free path length for the residual gases is substantially larger than the pore width of the porous insulating material with the result that the heat conductivity inside the casing remains low. It is especially preferred that the getter material is developed in the form of powder or pellets, and that it contains molecular sieve and/or zeolitic material, preferably also metal alloys.

The getter material is preferably homogeneously distributed in the insulating material; and preferably it is mixed in the insulating material prior to the thermal degassing with the result that the getter material also experiences a thermal degassing and then can develop an especially good getter effect in the thermo-insulating elements.

Preferably natural or synthetic kieselguhr is used as a porous, powdery insulating material; it has a low heat conductivity of its own, contains open capillary shaped pores toward the outside, and its individual particles have a strongly irregular structure —for instance, they are shaped in the form of stars, lancets, spheres, etc. Preferably the particle size of this material lies in the range between 1 and 100 $\mu$m; the pore size lies in the area of a few $\mu$m.

This material has all the properties necessary for an economical production of thermo-insulating elements of the highest quality, long service life, and great dimensional stability.

Advantageous further developments of the invention are indicated by the features of the subclaims.

Figure 2:
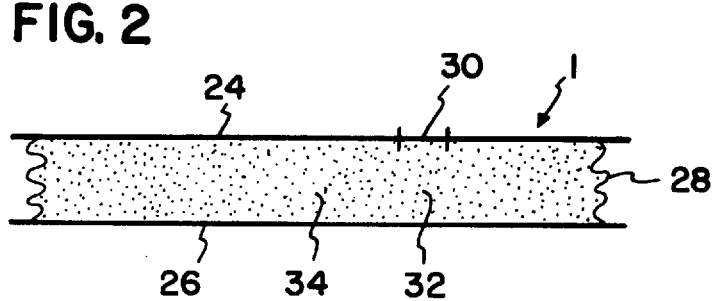

In the following, an embodiment of the invention is explained in more detail using the drawings. Shown are:

FIG. 1 A diagrammatic representation of the method according to the invention; and FIG. 2 A cross-section through a plate-shaped thermo-insulating element.

FIG. 1 shows, in a diagram, the course of the method for producing flat thermo-insulating elements. From a storage container (2), porous, powdery insulating material—for instance, kieselguhr—is fed into a vacuum dryer (6) by way of a screw conveyor (4).

The insulating material is degassed in the vacuum dryer (6) by a first vacuum pump and heated during the process by a (not-represented) heating device, in order that an effective degassing of the insulating material—that is, a release of the impurities adsorbed to the surface of the insulating material—can take place.

From a second storage container (10), getter material—for instance, powdery or pellet-shaped molecular sieve, zeolitic material, and/or metal alloys—are supplied to the vacuum dryer (6). In the vacuum dryer (6), the getter material is homogeneously mixed with the insulating material and also thermally degassed.

From vacuum dryer (6) the mixture of insulating material and getter material is supplied to a filling station (18), by way of an intermediate container (12) under vacuum and a conveying mechanism (14), which is also under vacuum, and is poured, under vacuum, into the already pre-evacuated casing (1) of an insulating element.

In the represented embodiment, the casing consists of a cover plate (4), a bottom plate (6), and a circular bellows; compare especially FIG. 2.

The casing (1), which receives the mixture of insulating material and getter material from the conveyor belt )14) is continually connected in the filling station (18) with a second vacuum pump (16), which pre-evacuates the casing and keeps the casing evacuating during the entire filling procedure. After the filling, the casing is separated from the vacuum pump (16) and hermetically closed off with a suitable closure (10).

FIG. 2 shows a cross-section through a plate-shaped thermo-insulating element. The casing (1) consists of a cover plate (24), a bottom plate (26), and a circular bellows (28) that connects the cover plate and the bottom plate with each other vacuum-tightly. In the cover plate, a filling hole (30) is provided that can be hermetically closed off by an appropriate closure (not represented), after a powdery mixture (32) of insulating and getter material has been poured into the casing (1).

I claim:

1. A method for producing thermo-insulating elements wherein porous, powdery insulating material is thermally degassed and poured into an evacuated casing, the method comprising:

mixing getter material to the insulating material to form a mixture;

thermally degassing the mixture; and introducing the pre-degassed mixture into a pre-evacuated casing, thereafter sealing said evacuated casing.

2. The method according to claim 1, wherein the step of thermally degassing the mixture is carried out in a vacuum drier.

3. The method according to claim 2, wherein the step of introducing the mixture into an evacuated casing comprises feeding the mixture from the vacuum drier to a permanently evacuated intermediate container.

4. The method according to claim 2, wherein the mixture is transferred from the intermediate container to the pre-evacuated casing while maintaining the mixture under continuous vacuum.

5. The method according to claim 1, wherein the step of mixing getter material to the insulating material comprises forming a mixture wherein the getter material is homogeneously distributed in the insulating material.

6. The method according to claim 1, wherein the step of mixing getter material to the insulating material comprises mixing powdery molecular sieve to the insulating material.

7. The method according to claim 1, wherein the step of mixing getter material to the insulating material comprises mixing pellet-shaped molecular sieve to the insulating material.

8. The method according to claim 1, wherein the step of mixing getter material to the insulating material comprises mixing getter material comprising zeolitic material to the insulating material.

9. The method according to claim 1, wherein the step of mixing getter material to the insulating material comprises mixing getter material comprising a metal alloy to the insulating material.

* * * * *